Feb. 23, 1943. D. GARDNER Re. 22,274
ELECTRIC FURNACE
Original Filed Oct. 10, 1938
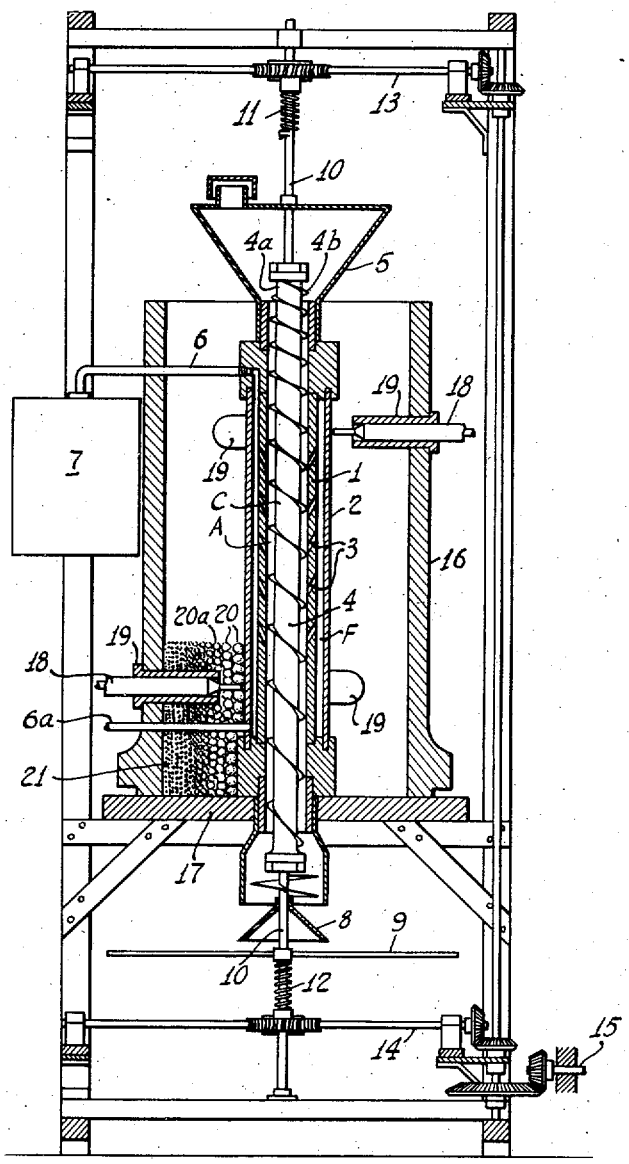
INVENTOR:
Daniel Gardner
BY
Morrison, Kennedy & Campbell
ATTORNEYS.

Reissued Feb. 23, 1943 Re. 22,274

UNITED STATES PATENT OFFICE 22,274

ELECTRIC FURNACE

Daniel Gardner, New York, N. Y., assignor, by mesne assignments, to Gardner Thermal Corporation, a corporation of Delaware Original No. 2,195,453, dated April 2, 1940, Serial No. 234,099, October 10, 1938. Application for reissue February 17, 1942, Serial No. 431,229

11 Claims. (Cl. 13—23)

This invention relates to electric furnaces of the class adapted for carrying out chemical, metallurgical or heat-treatment operations, at suitable high temperatures according to the treatment in hand. Particularly the invention pertains to an electric furnace with tubular type of reaction chamber, which thus is continuously operable, the ores or other mixtures or substances progressing longitudinally from furnace inlet to discharge through the chamber, e. g., with downward trend to cooperate with gravity. The general objects are to afford increased rate of output, with improved efficiency and thoroughness of reaction, and with reliable maintenance and control of treatment temperature and duration; and further advantages will appear from the following disclosure of an illustrative embodiment of the invention, including durability of apparatus, continuous relief of generated gases and economy as to heat losses and current consumption.

In a furnace according to the present invention, the reaction chamber is refractory walled, its wall being closed against air entrance to the chamber, but of hollow structure or double-walled to provide gas interspaces constituting a longitudinally extending wall flue, from which flue leads an extension passage or conduit to a separate place of disposal or reception, as to a vapor condensing vessel; the inner wall part or face being perforated for gas outflow from the chamber space to the flue; there being a body of electrical-resistance-heating material arranged surrounding the outer wall part of the chamber wall and in heating relation thereto and adapted to have suitable current supplied to it; and co-operative therewith an interior mechanical feed device as a screw, of refractory material, occupying the chamber and operable or relatively rotatable therein progressively to convey or cause the advancing feed of the mass of substances under treatment. By designating as refractory the chamber wall and the feed screw this term is intended in its broad sense of being resistant to the high temperatures of treatment, and preferably also to corrosion from the substances contacted; and these parts should be heat conductive as well. The term gas is used in the broad sense of including vapors. As regards the resistance heating material this is preferably in subdivided or granular form, and the generation of heat is effected in one or both of two ways, namely, partly by the resistance encountered by the electric current in its passage through the furnace or material, partly by small electric arcs generated between the coarser particles of material, into which the electrodes project. Said material surrounds the furnace chamber, in which the treatment is to be carried out, in such a preferred arrangement that the size of the granules or particles decreases, from the inside or chamber wall towards the outside or casing, to an exceedingly fine condition; so that the outer layer of the granular material is formed by a fine powder which, by virtue of the very high internal resistance between its particles, actually functions as an insulator, both electrically and thermally; the granules of the inner layer of said material, however, having a relatively large size, for example of about 3 to 8 mm., so that electric arcs can be formed between the same.

In order that the above statements may be more readily understood, reference is had to the annexed drawing, in which the single figure illustrates, in a vertical sectional elevation, one embodiment of an electric furnace constructed in accordance with the invention.

The furnace chamber C has it interior space enclosed by its refractory wall 1—2 which is hollow and shown composed of a first wall part or inner cylinder 1 of graphite, petroleum coke, silicon carbide, zirconium carbide or other conductive material suitable for the purpose; and surrounding the inner cylinder, with a narrow interspace or flue F between, an outer cylinder or wall part 2 of similar material.

The furnace chamber C has its inner wall part 1 provided with upwardly inclined perforations or narrow passages 3, constituting exits for the escape of gases such as metal vapors to the wall flue F. Interiorly the chamber is fitted with a mechanical feed device or impeller screw 4 of refractory material such as graphite or petroleum coke. This driven feed device or screw, rotatable relatively to the chamber, occupies axially the chamber space so as to act directly on the solid substances under treatment and progressively convey or cause the advancing feed of the mass; and the pitch of said screw is shown as varying, namely, increasing from the infeed or upper end to the discharge or lower end of the furnace. The screw feeder extends upwardly and into a hopper 5 which serves for supplying the material to be treated, for instance suitably ground ore in mixture with any required agents, as fluxes.

At one end, in this case the upper end, the interspace F between the chamber wall parts or cylinders 1 and 2 communicates, through a conduit or extension passage 6, with a separate place of disposal as a condensing vessel or chamber 7.

Near the other end of the wall flue F is shown an inlet pipe or passage 6a extending between an exterior point and the wall flue.

The furnace and chamber are shown with downfeed, being arranged upright, and the lower end of the chamber tube is shown as being enlarged and discharging at some distance vertically above and on to a conical distributor or screen 8, which serves for distributing the material discharged from said chamber over a discharge table 9, and each of these parts 8 and 9 may be secured to the spindle or drive shaft 10 of the impeller screw 4, and thus partake of the rotation of the screw.

The spindle 10 is shown driven at both ends, through the medium of resilient couplings or cushioning springs 11, 12, by driving worms on shafts 13, 14 meshing with worm wheels to which the spring couplings are connected. The two shafts are adapted to be rotated, through bevel gearing, from a common power shaft 15 with such reduction that the speed of the shaft 10 and feeder 4 is, for exa ıple, of the order of about one revolution per minute, but naturally varied according to the desired duration of treatment in any particular case.

Referring further to the feeding device or rotary screw 4, this is shown in its preferred form comprising a refractory and heat conductive stem or core 4a mounted on the operating shaft 10, and feed ribs or screw threads 4b projecting from the core substantially to the chamber inner wall part 1. By this arrangement the ground mass does not fill the chamber but occupies only the annular space or path A between the core 4a and the wall 1. By having the screw stem relatively thick and the annular path relatively thin, as shown, the advancing mass between these hot parts, which itself may be a poor heat conductor, becomes rapidly, thoroughly and uniformly heated throughout the mass, to the great betterment of the reaction or treatment.

The outer wall part 2 of the chamber wall is shown surrounded by a body 20—21 of electrical-resistance-heating material contained in a relatively wide space between the chamber and a refractory casing or jacket 16 of composition comprising asbestos, magnesia, aluminum oxide or the like, said exterior casing shown resting on a refractory base or slab 17, which itself is supported by a steel framework, upon which also the bearings of the driving gearing are mounted.

Electric current is introduced to the mass 20—21 by electrodes 18, of which three are shown as extended through apertures provided, at different levels, in the jacket 16. Said electrodes are arranged to be radially slidable in suitably cooled sleeves or bushes 19, and the inner end of each electrode is provided with a readily renewable wearing piece or tip of reduced cross section, said piece preferably being screwed into the inner end of the body of the electrode.

The ample space between the reaction chamber and the exterior jacket 16 is filled with resistance material, preferably granular and in graded arrangement. The innermost layer 20, i. e., the layer adjacent to the chamber outer wall part 2, consists of relatively coarse granules, as of coke, graphite, or the like. The outermost layer 21, i. e., the layer adjacent to the casing or jacket 16, consists of very fine or pulverized material such as soot (lamp black, carbon black) affording an insulating function, and optionally it may be mixed with magnesia, aluminum oxide or the like, and this layer may be suitably compressed, for instance, briquetted. The space intermediate said layers 20 and 21 is filled with a layer 20a of granular carbon or the like, the size of these granules decreasing, in outward direction, for example, from a size substantially corresponding to that of the granules of the inner layer 20, substantially to a size corresponding to that of the particles of the outer layer 21. The inner portion of the body 20—20a—21 of heating material, when subjected to a suitable current, generates and maintains the desired temperature in the tubular wall of chamber C, which is communicated to the advancing annulus of ore or other mixture and to the cylindrical core of the feed device operating in the chamber.

The modus operandi of the described furnace is preferably as follows:

First, the electrodes 18 are shifted or slid inward, until their inner extremities or wear tips directly contact with the chamber outer wall part 2, whereupon the current is switched on. The current will thereupon flow between electrodes principally through the chamber wall, which is thus quickly heated to the required temperature. About then or thereafter the feeder or screw is begun to be rotated, whereby the powdered ore or substance to be treated is caused slowly to advance descendingly from the hopper 5 into and through the reaction chamber, each portion being subject to the hot treatment for a prolonged period until reaching the bottom or discharge opening. When the furnace chamber and the mixture therein have once reached the desired treatment temperature, so that from that moment onward the electrical energy supplied through the electrodes 18 serves only for maintaining such temperature, the electrodes are readjusted and retracted a little from the chamber, whereby the current will thereafter pass for the greater part through the coarse carbon granules 20, which by that time have already assumed a high temperature. As a consequence, small electric arcs will be formed between said granules. generating heat thus and by resistance, and the total strength of the needed current will be considerably reduced. The extent of retraction of the electrodes and therefore their degree of immersion in the resistance mass may be varied at will by way of control of the electric flow and generation of temperature.

As stated, the very fine carbon powder or soot in the outermost layer in the space between the chamber wall and jacket 16 acts as a heat insulator, so that the jacket or casing remains relatively cool, minimizing heat loss. Besides, said fine material also acts as an electric insulator, especially when magnesia or the like has been admixed therewith.

If desired, the electrodes can be adjusted in position by automatic means, as under the control of a suitable thermostat, by way of controlling the heating action to maintain a desired temperature.

The separate vessel or receiving chamber 7 can be used for collecting and condensing gaseous products that may be formed in the reaction chamber, for instance, vapors of metals, as zinc.

The increasing pitch of screw 4 in downward direction towards discharge may in some cases be useful to prevent the solids under treatment from clogging the reaction chamber.

What is claimed is:

1. An electric furnace comprising a base, a reaction chamber with a hollow wall structure surrounding said chamber, said structure consisting of inner and outer wall parts, with inclined channels in the inner wall part of said hollow wall connecting the reaction chamber interior with the interspace or flue in the hollow wall, a condenser connected to said chamber wall interspace, an outer casing encircling said chamber wall structure with a space between said chamber wall and casing, means for introducing supplies of solid substances into said chamber for treatment, means for discharging the treated substances from the chamber, an insulating layer located adjacent to the inner face of said outer casing and occupying the outer portion of said space, a plurality of concentric layers of resistance heating material constituting a heating zone between said insulating layer and the outer face of said chamber wall structure, said concentric layers or zone forming the main furnace heating means and consisting of current conducting particles of which the size gradually increases in the direction from said insulating layer towards said chamber wall structure, and displaceable electrodes supported by said outer casing and protruding through said heat insulating layer into said heating zone.

2. An electric furnace comprising a base, a reaction chamber with a hollow wall structure surrounding said chamber, said structure consisting of inner and outer wall parts, with inclined channels in the inner wall part of said hollow wall connecting the reaction chamber interior with the interspace or flue in the hollow wall, a condenser connected to said chamber wall interspace, an outer casing encircling said chamber wall structure with a space between said chamber wall and casing, means for introducing supplies of solid substances into said chamber for treatment, a screw conveyor within the chamber for feeding the substances through the same, the pitch of said conveyor increasing from its upper to its lower end, and means for discharging the treated substances from the chamber, an insulating layer located adjacent to the inner surface of said outer casing and occupying the outer portion of said space, a plurality of concentric layers of resistance heating material constituting a heating zone between said insulating layer and the outer face of said chamber wall structure, said concentric layers or zone forming the main furnace heating means and consisting of current conducting particles of which the size gradually increases in the direction from said insulating layer towards said chamber wall structure, and displaceable electrodes supported by said outer casing and protruding through said heat insulating layer into said heating zone, said electrodes being provided with exchangeable tips.

3. An electric furnace comprising a base, a tubular reaction chamber, a chamber wall structure enclosing the chamber, an outer casing encircling said chamber wall structure, means for feeding the substances to be treated to said chamber from above and for discharging the same from below, an insulating layer located next to the inner surface of said outer casing, a plurality of concentric layers of current conducting particles in a zone between said insulating layer and said chamber wall-structure forming the heating means of the furnace, the particle size of said layers gradually increasing in the direction from said insulating layer inwardly towards said chamber wall structure, and displaceable electrodes supported by said outer casing.

4. A continuously-operable electric furnace for treating solid substances or mixtures, having a furnace support or base and an outer enclosure or casing, and substance infeeding and discharging means, and comprising in combination therewith, a refractory-walled tubular reaction chamber arranged longitudinally between the furnace infeed and point of discharge of the substances to be treated, said chamber wall being closed but of hollow structure to provide gas or vapor interspaces constituting a longitudinal wall flue, with an extension passage leading from such flue to a separate place of disposal as to a condensing vessel, and said chamber wall having perforations in its inner face for outflow of gases or vapors from the chamber interior to the wall flue, a body of electrical-resistance-heating material arranged surrounding the chamber wall in heating relation thereto, and provided with current-supplying or electrode members, and an interior mechanical feed device as a rotatable screw of refractory material occupying and relatively operable within the chamber adapted progressively to convey or cause the advancing feed of the mass of substances under treatment.

5. A continuously-operable high-temperature, metallurgical electric furnace for treating ore substances, and distilling metals therefrom, having a furnace support or base and an outer enclosure or casing, and substance infeeding and discharging means, and comprising a combination therewith, a refractory-walled tubular reaction chamber arranged between the furnace infeed and discharge, said chamber wall being closed but of hollow structure to provide interspaces constituting a wall flue, with an extension passage adapted to conduct vapors from such flue to a separate condensing vessel, and said chamber wall having perforations in its inner face adapted for outflow of vapors from the chamber interior to the wall flue, a body of electrical-resistance-heating material arranged surrounding the chamber wall in heating relation thereto adapted to generate temperatures sufficient to vaporize metals from such ore substances, and provided with current-supplying or electrode members, and an interior mechanical feed device as a rotatable screw of refractory material occupying and relatively operable within the chamber adapted progressively to convey or cause the advancing feed therethrough of the mass of substances under treatment.

6. A continuously-operable electric furnace for treating solid substances or mixtures, having a furnace support or base and an outer enclosure or casing, and substance infeeding and discharging means, and comprising in combination therewith, a refractory-walled tubular reaction chamber arranged between a higher furnace infeed means and a lower discharge means for the substances treated, said chamber wall being closed but of hollow structure to provide gas interspaces constituting an upwardly extending wall flue, with an extension passage leading from the upper end of such flue to a separate place of disposal, and said chamber wall having perforations in its inner face for outflow of gases or vapors from the chamber interior to the wall flue, a body of electrical-resistance-heating material arranged surrounding the chamber wall in heating relation thereto and with electrodes to conduct current thereto, and an interior mechanical feed device comprising a rotatable screw of refractory material occupying and relatively operable within the chamber adapted progressively to convey or cause the advancing downfeed of the mass of substances under treatment, at a predetermined rate of screw rotation and speed of downfeed.

7. An electric furnace as in claim 4 and wherein the body of electrical-resistance-heating material is in subdivided or granular form confined between the chamber wall and the outer casing, such material being of graded sizes of particles methodically arranged with the coarser particles adjacent to the chamber and the finer particles adjacent to the casing.

8. An electric furnace as in claim 4 and wherein the body of electrical-resistance-heating material is in subdivided or granular form confined between the chamber wall and the outer casing, such material being of graded sizes of particles methodically arranged with the coarser particles adjacent to the chamber and the finer particles adjacent to the casing; the layer which is nearest to the casing being composed of particles of such fineness as afford insulation protecting the outer casing.

9. An electric furnace as in claim 4 and wherein the body of electrical-resistance-heating material is in subdivided or granular form confined between the chamber wall and the outer casing, such material being of graded sizes of particles methodically arranged with the coarser particles adjacent to the chamber and the finer particles adjacent to the casing; and wherein are electrodes extending through the casing into the mass of granlar material and shiftable into and out of substantial contact with the chamber wall and bodily removable for renewal and adjustable as to the degree of extension into the granular mass.

10. An electric furnace as in claim 4 and wherein the mechanical feed device or screw comprises a refractory central stem or core of substantial diameter thereby with the chamber wall defining an annular path for the advancing solids, wherein rapid, thorough and uniform heating of the solids occurs.

11. An electric furnace as in claim 6 and wherein the feed screw pitch varies along its length with increase of pitch toward the furnace discharge.

DANIEL GARDNER.